US012692653B2

(12) United States Patent
Purdy et al.

(10) Patent No.: US 12,692,653 B2
(45) Date of Patent: *Jul. 28, 2026

(54) APPROACH TO BIOMASS DELIGNIFICATION

(71) Applicant: SixRing Inc., Calgary (CA)

(72) Inventors: Clay Purdy, Medicine Hat (CA); Markus Weissenberger, Calgary (CA); Markus Pagels, Calgary (CA); Kyle G. Wynnyk, Calgary (CA); Matthew DeWit, Calgary (CA); Andrew M. Corbett, Calgary (CA)

(73) Assignee: SIXRING INC., Calgary (CA)

( * ) Notice: Subject to any disclaimer, the term of this patent is extended or adjusted under 35 U.S.C. 154(b) by 30 days.

This patent is subject to a terminal disclaimer.

(21) Appl. No.: 18/439,589

(22) Filed: Feb. 12, 2024

(65) Prior Publication Data

US 2024/0247438 A1     Jul. 25, 2024

Related U.S. Application Data

(62) Division of application No. 17/405,028, filed on Aug. 18, 2021, now Pat. No. 11,905,656.

(30) Foreign Application Priority Data

Dec. 18, 2020     (CA) ................................. CA 3102925

(51) Int. Cl.
| | |
|---|---|
| *D21C 3/04* | (2006.01) |
| *C01B 15/04* | (2006.01) |
| *C09K 3/00* | (2006.01) |
| *D21C 3/00* | (2006.01) |
| *D21C 9/16* | (2006.01) |

(52) U.S. Cl.
CPC ................ *D21C 3/04* (2013.01); *C01B 15/04* (2013.01); *C09K 3/00* (2013.01); *D21C 3/003* (2013.01); *D21C 9/163* (2013.01)

(58) Field of Classification Search
CPC .......... D21C 3/04; D21C 3/003; D21C 9/163; D21C 1/02; D21C 3/06; D21C 3/20; D21C 3/22; D21C 1/04; D21C 9/002; D21C 9/007; D21C 11/0007; C01B 15/04; C09K 3/00; Y02E 50/10; Y02E 50/30; Y02W 30/62
See application file for complete search history.

(56) References Cited

U.S. PATENT DOCUMENTS

| | | | |
|---|---|---|---|
| 2,855,351 | A | 10/1958 | Robert |
| 3,509,206 | A | 4/1970 | Nielsen |
| 3,556,883 | A | 1/1971 | Naito et al. |
| 3,655,738 | A | 4/1972 | Nielsen |
| 3,801,512 | A | 4/1974 | Solenberger |
| 3,869,401 | A | 3/1975 | Ernst |
| 3,962,030 | A | 6/1976 | Sullivan |
| 4,113,747 | A | 9/1978 | Prescher et al. |
| 4,222,819 | A | 9/1980 | Fossum et al. |
| 4,280,914 | A | 7/1981 | Knorre et al. |
| 4,316,026 | A | 2/1982 | Hatano et al. |
| 4,410,397 | A | 10/1983 | Kempf |
| 4,420,616 | A | 12/1983 | Ikegami et al. |
| 4,427,490 | A | 1/1984 | Eckert |
| 4,459,216 | A | 7/1984 | Nakazato et al. |
| 4,626,319 | A | 12/1986 | Krueger et al. |
| 4,704,404 | A | 11/1987 | Sanderson |
| 4,740,212 | A | 4/1988 | Yant et al. |
| 4,756,845 | A | 7/1988 | Sugawara et al. |
| 4,935,499 | A | 6/1990 | Ruske et al. |
| 5,080,756 | A | 1/1992 | Kutney |
| 5,252,183 | A | 10/1993 | Shaban et al. |
| 5,474,654 | A | 12/1995 | Mendiratta et al. |
| 5,691,193 | A | 11/1997 | Paice et al. |
| 5,756,413 | A | 5/1998 | Bogdanovic et al. |
| 5,800,859 | A | 9/1998 | Price et al. |
| 5,955,050 | A | 9/1999 | Drexler |
| 5,968,486 | A | 10/1999 | Newell et al. |
| 6,048,437 | A | 4/2000 | Fukushima et al. |
| 6,162,503 | A | 12/2000 | Ferrier |
| 6,176,937 | B1 | 1/2001 | Colgan et al. |
| 6,187,170 | B1 | 2/2001 | Hampp |

(Continued)

FOREIGN PATENT DOCUMENTS

| | | |
|---|---|---|
| CA | 2134210 A1 | 11/1993 |
| CA | 2711182 A1 | 7/2009 |

(Continued)

OTHER PUBLICATIONS

"International Search Report, written opinion and International Preliminary Report on Patentability issued in PCT/CA2021/000082 on Dec. 28, 2021".
"Coastal Chemical: Diethanolamine (DEA) Secondary Amine [online], [retrieved on Nov. 5, 2022]. Retrieved from the internet:", URL: https://coastalchem.com/products/generic-amines/diethanolamine-dea-secondary-amine/ (Year: 2022).
"Dow: Ethanolamines [online], [retrieved on Nov. 5, 2022]. Retrieved from the internet:", URL: http://www.resikem.com.ar/images/ dow-ethanolamines.pdf. (Year: 2022).
"The Chemical Company: Triethanolamine (TEA, TEOA) [online] [retrieved on Nov. 5, 2022]", Retrieved from the internet:<URL:https ://thechemco.com/chemical/triethanolamine/. > (Year: 2025).

(Continued)

*Primary Examiner* — Andrew J. Oyer
(74) *Attorney, Agent, or Firm* — Blank Rome LLP

(57) ABSTRACT

Disclosed herein are compositions comprising an acid; a modifying agent selected from the group consisting of: sulfamic acid; imidazole; an imidazole derivative; taurine; a taurine derivative; a taurine-related compound; an alkylsulfonic acid; an arylsulfonic acid; triethanolamine; and combinations thereof; a peroxide salt; and a peroxide. Also disclosed herein are compositions comprising an acid; a modifying agent comprising a compound containing an amine group and a compound comprising a sulfonic acid moiety; a peroxide salt; and a peroxide.

13 Claims, No Drawings

(56) References Cited

U.S. PATENT DOCUMENTS

| | | | |
|---|---|---|---|
| 6,554,948 | B1 | 4/2003 | Ferrier |
| 6,602,440 | B2 | 8/2003 | Bishop et al. |
| 6,770,168 | B1 | 8/2004 | Stigsson |
| 7,771,737 | B2 | 8/2010 | Man et al. |
| 8,999,194 | B1 | 4/2015 | Tsai et al. |
| 9,179,551 | B2 | 11/2015 | Takahashi et al. |
| 9,315,942 | B2 | 4/2016 | Nuopponen et al. |
| 9,499,405 | B2 | 11/2016 | Dindi |
| 9,890,321 | B2 | 2/2018 | Shumway |
| 9,947,938 | B2 | 4/2018 | Rachel et al. |
| 10,006,169 | B2 | 6/2018 | Dietz et al. |
| 10,053,438 | B2 | 8/2018 | Bolz et al. |
| 10,144,786 | B2 | 12/2018 | Hindi et al. |
| 11,084,885 | B2 | 8/2021 | Li et al. |
| 11,668,047 | B2 | 6/2023 | Purdy et al. |
| 11,760,720 | B2 | 9/2023 | Purdy et al. |
| 11,820,041 | B2 | 11/2023 | Boitouzet |
| 11,821,139 | B2 | 11/2023 | Purdy et al. |
| 11,846,067 | B2 | 12/2023 | Purdy et al. |
| 11,905,656 | B2 | 2/2024 | Purdy et al. |
| 11,965,289 | B2 | 4/2024 | Purdy et al. |
| 11,982,051 | B2 | 5/2024 | Weissenberger et al. |
| 11,982,052 | B2 | 5/2024 | Purdy et al. |
| 12,065,628 | B2 | 8/2024 | Purdy et al. |
| 12,065,780 | B2 | 8/2024 | Purdy et al. |
| 12,071,724 | B2 | 8/2024 | Purdy et al. |
| 12,084,364 | B2 | 9/2024 | Purdy et al. |
| 12,123,138 | B2 | 10/2024 | Purdy et al. |
| 2003/0089472 | A1 | 5/2003 | Cheng et al. |
| 2003/0224960 | A1 | 12/2003 | Scialla et al. |
| 2004/0092102 | A1 | 5/2004 | Li et al. |
| 2004/0099637 | A1 | 5/2004 | Johnson et al. |
| 2004/0244925 | A1 | 12/2004 | Tarasenko |
| 2006/0014391 | A1 | 1/2006 | Lee et al. |
| 2008/0206995 | A1 | 8/2008 | Tomiga et al. |
| 2010/0203605 | A1 | 8/2010 | Kim et al. |
| 2010/0291722 | A1 | 11/2010 | Kim et al. |
| 2010/0317070 | A1 | 12/2010 | Agaskar |
| 2011/0174451 | A1 | 7/2011 | Dietz |
| 2012/0024818 | A1 | 2/2012 | Ono et al. |
| 2012/0111714 | A1 | 5/2012 | Court et al. |
| 2012/0168075 | A1 | 7/2012 | Abys et al. |
| 2012/0217500 | A1 | 8/2012 | Park et al. |
| 2013/0122701 | A1 | 5/2013 | Krupa et al. |
| 2013/0156631 | A1* | 6/2013 | Kumagai ................. C23G 1/36 |
| | | | 205/722 |
| 2013/0175238 | A1 | 7/2013 | Hong et al. |
| 2013/0309723 | A1 | 11/2013 | Huang et al. |
| 2014/0038348 | A1 | 2/2014 | Kim et al. |
| 2014/0069599 | A1 | 3/2014 | Bryant et al. |
| 2014/0113843 | A1 | 4/2014 | Shumway |
| 2014/0121145 | A1 | 5/2014 | Paasche et al. |
| 2014/0322349 | A1 | 10/2014 | Martin |
| 2014/0349359 | A1 | 11/2014 | Fernholz et al. |
| 2015/0087030 | A1 | 3/2015 | Jain et al. |
| 2015/0136345 | A1 | 5/2015 | Tunc et al. |
| 2015/0247009 | A1 | 9/2015 | Mitchell |
| 2016/0017540 | A1 | 1/2016 | Paripati et al. |
| 2016/0021888 | A1 | 1/2016 | Burke et al. |
| 2016/0074549 | A1 | 3/2016 | Lei et al. |
| 2016/0244913 | A1 | 8/2016 | Tsuruga et al. |
| 2016/0264420 | A1 | 9/2016 | Dindi |
| 2016/0298294 | A1 | 10/2016 | Dietz et al. |
| 2016/0304989 | A1 | 10/2016 | Pujari et al. |
| 2018/0171227 | A1 | 6/2018 | Hsu et al. |
| 2018/0187129 | A1 | 7/2018 | Traistaru et al. |
| 2018/0370071 | A1 | 12/2018 | Boitouzet et al. |
| 2019/0031545 | A1 | 1/2019 | Buschmann et al. |
| 2019/0288015 | A1 | 9/2019 | Kim et al. |
| 2020/0010959 | A1 | 1/2020 | Hong |
| 2020/0011389 | A1 | 1/2020 | Koizumi et al. |
| 2021/0269394 | A1 | 9/2021 | Purdy et al. |
| 2021/0269970 | A1 | 9/2021 | Purdy et al. |
| 2021/0269971 | A1 | 9/2021 | Purdy et al. |
| 2021/0348202 | A1 | 11/2021 | Larsen et al. |
| 2022/0170206 | A1 | 6/2022 | Purdy et al. |
| 2022/0267178 | A1 | 8/2022 | Purdy et al. |
| 2022/0267953 | A1 | 8/2022 | Purdy et al. |
| 2022/0267954 | A1 | 8/2022 | Purdy et al. |
| 2022/0267956 | A1 | 8/2022 | Purdy et al. |
| 2023/0382852 | A1 | 11/2023 | Purdy et al. |
| 2023/0416985 | A1 | 12/2023 | Purdy et al. |
| 2024/0052566 | A1 | 2/2024 | Leksmon et al. |
| 2024/0150173 | A1 | 5/2024 | Purdy et al. |
| 2024/0209121 | A1 | 6/2024 | Adbelfatah et al. |
| 2024/0209159 | A1 | 6/2024 | Enriquez et al. |
| 2024/0247438 | A1 | 7/2024 | Purdy et al. |
| 2024/0263394 | A1 | 8/2024 | Purdy et al. |
| 2024/0295073 | A1 | 9/2024 | Purdy et al. |
| 2024/0309585 | A1 | 9/2024 | Purdy et al. |
| 2024/0318381 | A1 | 9/2024 | Purdy et al. |
| 2024/0368834 | A1 | 11/2024 | Purdy et al. |

FOREIGN PATENT DOCUMENTS

| | | | | |
|---|---|---|---|---|
| CA | 2744569 | A1 | 6/2010 | |
| CA | 2658971 | C | 9/2011 | |
| CA | 3128672 | A1 | 8/2022 | |
| CA | 3128675 | A1 | 8/2022 | |
| CA | 3128676 | A1 | 8/2022 | |
| CA | 3128677 | A1 | 8/2022 | |
| CN | 1470552 | A | 1/2004 | |
| CN | 101445933 | B | 4/2013 | |
| CN | 102432686 | B | 6/2013 | |
| CN | 103572306 | A | 2/2014 | |
| CN | 103820796 | A | 5/2014 | |
| CN | 104060307 | A | 9/2014 | |
| CN | 104810161 | A | 7/2015 | |
| CN | 105294580 | A | 2/2016 | |
| CN | 104060308 | B | 9/2016 | |
| CN | 106044736 | A | 10/2016 | |
| CN | 107089908 | A | 8/2017 | |
| CN | 107190547 | A | 9/2017 | |
| CN | 107500418 | A | 12/2017 | |
| CN | 108069519 | A | 5/2018 | |
| CN | 108203829 | A | 6/2018 | |
| CN | 108468050 | A | 8/2018 | |
| CN | 108589368 | A | 9/2018 | |
| CN | 108624237 | A | 10/2018 | |
| CN | 109423648 | A | 3/2019 | |
| CN | 109628934 | A | 4/2019 | |
| CN | 109761380 | A | 5/2019 | |
| CN | 109877097 | A | 6/2019 | |
| CN | 109898085 | A | 6/2019 | |
| CN | 109930416 | A | 6/2019 | |
| CN | 110485188 | A | 11/2019 | |
| CN | 110813256 | A | 2/2020 | |
| CN | 111375618 | A | 7/2020 | |
| CN | 111979819 | A | 11/2020 | |
| CN | 112226790 | A | 1/2021 | |
| EP | 0199385 | A2 | 10/1986 | |
| EP | 0779357 | A1 | 6/1997 | |
| GB | 1270716 | A | * 4/1972 | ............. D21C 9/163 |
| JP | H07206804 | A | 8/1995 | |
| JP | H10101642 | A | 4/1998 | |
| JP | 2002180391 | A | 6/2002 | |
| JP | 2005213526 | A | 8/2005 | |
| JP | 2008253880 | A | 10/2008 | |
| JP | 4278705 | B1 | 3/2009 | |
| JP | 2010285697 | A | 12/2010 | |
| JP | 2013022761 | A | 2/2013 | |
| KR | 20090054926 | A | 6/2009 | |
| KR | 20150114655 | A | 10/2015 | |
| KR | 101715618 | B1 | 3/2017 | |
| KR | 20200135047 | A | 12/2020 | |
| MY | 189437 | A | 2/2022 | |

OTHER PUBLICATIONS

"PubChem: Ethanol amine (Compound) [online], [retrieved on Nov. 5, 2022]", Retrieved from the internet:<URL: https://pubchem.ncbi.nlm.nih.gov/compound/Ethanolamine.> (Year: 2025).

Fan, et al., "Facile and green synthesis of carboxylated cellulose nanocrystals as efficient adsorbents in wastewater treatments, ACS

(56) References Cited

OTHER PUBLICATIONS

Sustainable Chem. Eng., Just Accepted Manuscript", DOI: 10.1021/
acssuschemeng.9b05081 Publication Date (Web): Oct. 9, 2019
Downloaded from pubs.acs.org on Oct. 12, 2019, 34 pgs.

Takovlev, et al., "SO2-Ethanol-Water (SEW) Pulping: I. Lignin
Determination in Pulps and Liquors", Journal o1 Wood Chemistry
and Technology, 31, p. 233-249 (Year: 2011).

Kuznetsov, et al., "Kinetic study of aspen-wood sawdust delignifica-
tion by H2O2 with sulfuric acid catalyst under mild conditions",
Reac Kinet Mech Cat (2013) 110:271-280 (Year: 2013).

Rackemann, et al., "The effect of pretreatment on methanesulfonic
acid-catalyzed hydrolysis of bagasse to evulnic acid, formic acid,
and furfural", RSC Advances. 2016. 6(78):74525-35.

Regis, "What do these terms mean—Kappa values? [online], [retrieved
on Sep. 30, 2024]", Retrieved from the internet:<URL: https://
www.regis.de/en/pages/What-do-these-terms-mean-Kappa-values-/
1719/ > (Year: 2024).

Tang, et al., "Organic amine catalytic organosolv pretreatment of
corn stover for enzymatic saccharification and high-quality lignin",
Bioresource Technology, 2017, 232, 222-228 (Year: 2017).

Walter, et al., "The use of Fenton Chemistry for Reducing the
Refining Energy During TMP Production", the Effect of Free
Ferrous and Free or Chelated Ferric Ions, Department of Chemical
Engineering, Faculty of Science, Technology, and Media, Mid
Sweden University, SE-851 70 Sundsvall, Sweden, 2013.

Zhang, et al., "Effect of the temperature on the dissolution of corn
straw in ethanol solution", RSC Advances, 2016,102306-102314
published Oct. 21, 2016, Abstract.

* cited by examiner

APPROACH TO BIOMASS DELIGNIFICATION

CROSS REFERENCE TO RELATED APPLICATIONS

This application is a divisional of U.S. Non-provisional application Ser. No. 17/405,028 filed Aug. 18, 2021, which claims the benefit of Canada Application No. 3102925 filed Dec. 18, 2020, the entire contents of each of which are incorporated by reference herein.

FIELD OF THE INVENTION

The present invention is directed to a method of biomass delignification, more specifically to the use of peroxide salts in the delignification of a lignocellulosic feedstock.

BACKGROUND OF THE INVENTION

Petroleum or fossil fuel-based products include a vast array of products, such as surfactants, pharmaceuticals, plastics, fuels, polymers, aromatics and elastomers which are abundant and critical components in all facets of manufacturing consumer products and are utilized in all aspects of the global economy, in addition to fuels which are used to power vehicles, homes and industries. Climate change and environmental pressures are forcing industry to find alternatives to fossil fuels and petroleum-based products that are carbon-neutral, renewable and economic. A well-known source of all, or most all of the commercialized, technically proven petroleum-based products is lignocellulosic biomass, but there is yet a scalable, effective, economical process to extract these valuable constituents to be developed. Lignocellulosic biomass is the single most abundant source of carbon-neutral organic material on the planet and contains most all of the required compounds to sustain multiple industries including, but not limited to, energy production, chemicals, food, pharmaceuticals, high strength construction materials, various manufacturing and agriculture applications.

The total annual primary production of biomass is over 100 billion tonnes/yr. Cellulosic biomass is a renewable resource that, unlike fossil fuels, will never run out. However, to efficiently separate the three main components of lignocellulosic biomass (cellulose, lignin and hemicellulose) proves to be a challenge for it to be a strong and legitimate competitor or alternative to petroleum-based products. To benefit from lignocellulosic biomass and to be able to further utilize it, one must be able to separate the lignin from the hemicellulose and the cellulose in an economical, commercially viable process that retains all three components in a high purity state for further processing versus the processes now being utilized in scale that destroy or damage many of the valuable individual components. Cellulose is the most abundant organic polymer on earth. It is high molecular weight, possesses great strength and is biodegradable. Depending on the feedstock, cellulose can make up from 40 to 60 percent or in some cases more of the plant material and is found in trees, forestry residue, algae, crops, municipal and industrial waste, and various plants.

Furthermore, due to the strong hydrogen association and/or covalent bond between cellulose and lignin and hemicellulose, the efficient and commercially viable extraction of cellulose and other constituents will depend greatly on the method and biomass source utilized during the extraction process. Many current and proposed processing methods may limit the use or alter the structural integrity of the cellulose, or other valuable components, resulting in a marginal yield and excessive processing costs. In general, cellulose extracted from plant materials contains both an amorphous region and a crystalline region.

It is widely agreed that the technical and commercial challenges with the current known and commercialized processes, which are inefficient, expensive and difficult to scale with regards to direct separation of lignin and hemicellulose from the cellulose in the biomass is what prevents such technology from being a viable, cost-effective alternative for petroleum-based or fossil fuel products. Additionally, the industrial demand for many of the lignocellulose constituents, such as micro-crystalline cellulose (MCC), nano-crystalline cellulose (NCC), monosaccharides or lignin monomers and additional components, is substantial if they can be produced and processed in an economical manner. This demand comes from industries that include, but are not limited to, pharmaceuticals, food production, cosmetics, manufacturing, chemicals and fuels and energy production. Many of the aromatic hydrocarbon molecules yielded from biomass can be utilized or processed using much of the current oil & gas global infrastructure such as pipelines, processing facilities, upgraders and chemical production facilities with likely minimal alteration or retooling, along with downstream assets such as fueling stations once the biomass has been converted to common liquid fuels. This makes woody biomass the only real alternative to fossil fuel derived hydrocarbons as the next source of base chemicals and energy for the human race that is arguably carbon-neutral and endless. If collaboration exists with the current energy industry, government and new, scalable technology owners or developers industry could likely utilize much of the current global mid-stream and down-stream energy assets in use now, resulting in the retention of many jobs with minimal economic disruption. Much of these multi-trillion-dollar assets and many millions of jobs globally would be lost with other alternative energy sources such as solar or wind. A viable source of energy from woody biomass (as monosaccharides) would also make the internal combustion, jet engines and other already common power generation equipment carbon-neutral, thus retaining or minimizing disruption of other global incumbent industries with minimal interruption, such as the airline industry, automotive industry, chemical industry and the many hundreds of ancillary support industries.

One major, and financially successful, consumer of woody biomass is the pulp and paper industry. The first step in paper production and most energy-intensive one is the production of pulp. This is one of the current few sources of cellulosic material, although it is very inefficient, polluting and energy intensive. Notwithstanding water, wood and other plant materials used to make pulp contain three main components: cellulose; lignin; and hemicellulose. Pulping has a primary goal to separate the fibres from the lignin. Lignin is a three-dimensional crosslinked polymer which figuratively acts as a mortar to hold all the fibres together within the plant. Its presence in finished pulp is undesirable and adds no industrial value to the finished product. Pulping wood refers to breaking down the bulk structure of the fibre source, be it chips, stems or other plant parts, into the constituent fibres. The cellulose fibres are the most desired component with regards to paper manufacturing. Hemicelluloses are shorter branched carbohydrate polymers consisting of various monosaccharides which form a random amorphous polymeric structure. The presence of hemicellulose in finished pulp is also regarded as bringing no value to a paper product. This is also true for biomass conversion. The challenges are similar—only the desired outcome and constituents are different. Optimal biomass conversion would have the further breakdown to monosaccharides as a desired outcome, while the common pulp & paper processes normally stop right after lignin dissolution. With the process taught herein there would be many additional valuable constituents including, but not limited to microcrystalline cellulose (MCC), nanocrystalline cellulose (NCC) and cellulose nanofibres (CNF) along with other valuable commercial products yielded from the process effluent including, but not limited to, aromatic monomers.

There are two main approaches to preparing wood pulp or woody biomass: mechanical treatment and chemical treatment. Mechanical treatment or pulping generally consists of mechanically tearing the biomass input apart and, thus, tearing cellulose fibres apart in an effort to separate them from each other. The shortcomings of this approach include: broken cellulose fibres, thus shorter fibres (thus a loss of fibre aspect ratio (L:W)), and lignin being left on the cellulose fibres, thus being inefficient or non-optimal for most commercial applications. This process also consumes large amounts of energy and is capital intensive. There are several approaches included in chemical pulping. These are generally aimed at the depolymerization of the lignin and hemicellulose into small, water-soluble molecules. These now degraded components can be separated from the cellulose fibres by washing the latter without depolymerizing the cellulose fibres. The chemical process is currently energy intensive, requiring high amounts of heat and/or high pressures; in many cases, agitation or mechanical intervention are also required, further adding inefficiencies and costs to the process. In this process much of the effluent is waste product as well.

There exist pulping or treatment methods which combine, to a various extent, the chemical aspects of pulping with the mechanical aspects of pulping. To name a few, one must consider thermomechanical pulping (also commonly referred to as TMP), and chemi-thermomechanical pulping (CTMP). Through a selection of the advantages provided by each general pulping method, the treatments are designed to reduce the amount of energy required by the mechanical aspect of the pulping treatment. This can also directly impact the size, shape and tensile strength degradation of the fibres subjected to these combination pulping approaches. Generally, these approaches involve a shortened chemical treatment (compared to conventional exclusive chemical pulping) which is then typically followed by mechanical treatment to separate the fibres.

The most common process to make pulp for paper production is the kraft process. In the kraft process, wood chips are converted to wood pulp which is almost entirely pure cellulose fibres. The multi-step kraft process consists of a first step where wood chips are impregnated/treated with a chemical solution. This is done by soaking the wood chips and then pre-heating the wood chips with steam. This step swells the wood chips and expels the air present in the wood chips, replacing it with the treatment liquid. This produces black liquor, a resultant by-product from the kraft process. It contains water, lignin residues, hemicellulose and inorganic chemicals. White liquor is a strong alkaline solution comprising sodium hydroxide and sodium sulfide. Once the wood chips have been soaked in the various chemical solutions, they undergo cooking. To achieve delignification in the wood chips, the cooking is carried out for several hours at temperatures reaching up to 176° C. At these temperatures, the lignin degrades to yield water soluble fragments. The remaining cellulosic fibres are collected and washed after the cooking step.

U.S. Pat. No. 5,080,756 teaches an improved kraft pulping process and is characterized by the addition of a spent concentrated sulfuric acid composition containing organic matter to a kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Caro's acid, also known as peroxymonosulfuric acid ($H_2SO_5$), is one of the strongest oxidants known. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one yield in a further reaction potassium monopersulfate (PMPS) which is a valuable bleaching agent and oxidizer. While Caro's acid has several known useful applications, one noteworthy is its use in the delignification of wood. But because of its reactivity and dangers associated therewith, it is not a preferred approach to treat large volumes of material such as lignocellulosic biomass or feedstock.

Other methods have been developed for pretreating lignocellulosic feedstocks. These pretreatment methods include dilute acid pretreatment, steam explosion ($CO_2$ explosion), pH-controlled water pretreatment, ammonia fibre expansion, ammonia recycle percolation (ARP), and lime pretreatment (Mosier et al. 2005; Wyman et al. 2005; Yang and Wyman 2008). One approach involves the concept of organosolv. Organosolv pulping is the process to extract lignin from lignocellulosic feedstocks with organic solvents or their aqueous solutions. Organosolv pulping has attracted interest since the 1970's because the conventional pulping processes, kraft and sulfite processes, have some serious shortcomings such as air and water pollution. Organosolv pretreatment is similar to organosolv pulping, but the degree of delignification for pretreatment is not expected/required to be as high as that of pulping. However, a drawback of organosolv pre-treatment is the high temperatures at which the processes are known to be carried out at, upwards of 100-250° C., often times in the range of 185-210° C. Such temperatures require high energy inputs.

Improved processes for delignification need to take into account environmental aspects as well as end-product generation. Ambient temperature processes (20-30° C.) are highly desirable as they do not require energy intensive inputs. However, to carry out delignification operations at low temperatures and atmospheric pressure, strong acids are typically required. The strength of the acids used, while sufficient to remove lignin present on the lignocellulosic feedstock, can be deleterious to the lignin as it decomposes it beyond any lignin monomers which would be useable in other industries or applications, and can also damage the cellulose being yielded and therefore fail in delivering useable products from said feedstock.

Biofuel production is another potential application for the kraft process. One of the current drawbacks of biofuel production is that it typically requires the use of food grade plant parts (such as seeds) in order to transform the easily accessible carbohydrates into fuel in a reasonably efficient process. The carbohydrates could be obtained from cellulosic fibres, by using non-food grade biomass in the kraft process; however, the energy intensive nature of the kraft process for delignification makes this a less commercially viable option. In order to build a plant-based chemical resource cycle, there is a great need for energy efficient processes which can utilize plant-based feedstocks which do not compete with human food sources and are generally inexpensive to produce or which are generated as waste materials from agricultural processes or wood processing by-products, for example.

Research (HUNTLEY, C. "Influence of Strong Acid Hydrolysis Processing on the Thermal Stability and Crystallinity of Cellulose Isolated from Wheat Straw", 2014) has shown that extraction of cellulose from an agricultural waste product such as wheat straw using strong acid hydrolysis such as sulfuric and nitric acids will yield similar crystalline and thermal properties as currently reported in the literature. However, the effect of various strong acids on the polymeric, structural, and thermal properties of cellulose extracted from wheat straw impacted the crystallinity of the end product cellulose and it was found to be desirable to use weaker acids where the crystallinity of the final cellulose product is of importance.

In addition to the recovery of cellulose, the recovery of lignin is increasingly important. Most conversion technologies relating to dissolved lignin use heat and metal catalysts to effectively break down lignin into low molecular weight aromatics which hold value for other uses/applications across industry. Some of the considerations to take into account when exploring various processes include: efficiency of the catalysts used; the stability of the catalysts; control of the condensation and repolymerization reactions of lignin. The condensation and repolymerization of lignin often yield products which cannot be broken down easily using the conventional approaches and therefore lose a tremendous amount of value in terms of future uses/applications in industry. The condensation and repolymerization of lignin have a direct impact on the recovery of target lignin products (such as low molecular weight phenolic compounds). Thus, avoiding the condensation and repolymerization reactions is critical in order to maximize the yields of the target products.

The lignin repolymerization has been a substantial concern during many stages of the process of the delignification of lignocellulosic biomass. Conventional fractionation process, namely biomass pre-treatment, focuses on its effectiveness to remove lignin from biomass structure, generally employing acid or base catalysts. The resulting residual solid, mainly lignin, significantly undergoes irreversible repolymerization depending on the pre-treatment conditions. This is an outcome which must be avoided in order to extract maximum value from a treatment which is geared at recovering both cellulose and lignin for future uses.

While the kraft pulping process is the most widely used chemical pulping process in the world, it is extremely energy intensive and has other drawbacks, for example, substantial odours emitted around pulp producing plants or general emissions that are now being highly regulated in many pulp and paper producing jurisdictions. In light of the current environmental challenges, economic challenges and climactic changes, along with emission fees being implemented by governments, it is highly desirable to optimize the current pulping processes in order to provide at least linear quality fibres without the current substantial detriment to the environment during the production thereof. The kraft process produces fibres still requiring multi-step bleaching processes for use in paper (brownstock). This type of process requires the use of multiple steps typically including a number of chlorite/chlorine additions. It is desirable to reduce the input of chemicals (such as environmentally harmful chlorine derivatives) as well as reducing the energy input required to further process kraft pulps.

In light of the state of the prior art, there still exists a need for a composition capable of performing delignification on lignocellulosic biomass under reduced temperatures and pressures versus what is currently in use without requiring any major additional capital expenditures.

Preferably, the process would be adapted to preserve the lignocellulosic biomass constituents as much as possible for further applications. In addition, when heat and pressure are removed from the process the capital expenditures are greatly reduced as plastics, such as high-density polyethylene (HDPE) can be utilized versus metals for piping, reactors and associated equipment.

SUMMARY OF THE INVENTION

According to one aspect of the present invention, there is provided a process to delignify lignocellulosic biomass where the approach comprises the use of a modified acid by incorporating a modifying agent which tempers its reactivity and allows for more controlled/controllable reaction with the lignocellulosic feedstock. According to a preferred embodiment of the present invention, this step will allow for far more control in preventing cellulosic degradation from exposure to the acid systems.

Using a Caro's acid type approach can reduce the energy consumption in the processing of lignocellulosic biomass to obtain cellulose (in various grades such as MCC and NCC) as well as lignin monomers and oligomers. Caro's acid in itself is too reactive for a controlled delignification of biomass. When biomass is mixed with Caro's acid, it leads to a very exothermic reaction that forms carbon black. Modified acid/peroxide mixtures have shown their potential for biomass delignification. When the acid/peroxide mixture is inhibited with modifiers, cellulose can be produced at room temperature, drastically reducing energy consumption.

It was found that hemicellulose and lignin are preferentially de-polymerized by modified acid/peroxide mixtures and the cellulose remains mostly intact. However, these processes are relatively slow due to the inhibition of the acid and require a large amount of peroxide to break down lignin and hemicellulose. Due to the unspecific reaction mechanism, hydrogen peroxide is still consumed by the breaking up of lignin fragments which are already in solution. Reducing the reaction time and so the number of unnecessary oxidation reactions and consequently reducing the consumption of peroxide per unit of cellulose produced, would be beneficial to the industry and the environment.

According to an aspect of the present invention, there is provided a composition comprising:
  an acid;
  a modifying agent selected from the group consisting of: sulfamic acid; imidazole; an imidazole derivative; taurine; a taurine derivative; a taurine-related compound; alkylsulfonic acid; arylsulfonic acid; triethanolamine; and combinations thereof;
  a peroxide salt; and
  a peroxide, such as hydrogen peroxide. Preferably, the peroxide is in liquid form.
More preferably, it is diluted in water.

Preferably, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

Also preferably, the alkylsulfonic acid is selected from the group consisting of: methanesulfonic acid; ethanesulfonic acid; propanesulfonic acid; butanesulfonic acid and combinations thereof.

Also preferably, arylsulfonic acid is selected from the group consisting of: toluenesulfonic acid; benzenesulfonic acid; and combinations thereof.

According to a preferred embodiment, the acid and the peroxide salt are present in a molar ratio ranging from 1:1 to 100:1.

According to a preferred embodiment, the acid and the peroxide salt are present in a molar ratio ranging from 20:1 to 100:1.

Preferably, the peroxide salt is selected from the group consisting of: organic peroxides; hydroperoxides; inorganic peroxides; and combinations thereof.

According to a preferred embodiment of the present invention, the inorganic peroxide is selected from the group consisting of: potassium persulfate, sodium perborate, sodium percarbonate; ammonium persulfate; and combinations thereof.

Preferably, the organic peroxide is selected from the group consisting of: dicumyl peroxide; tert-butyl peroxybenzoate; tert-butyl hydroperoxide; tert-butyl peroxide; tert-butyl peracetate; benzoyl peroxide; lauroyl peroxide; 2,5-Bis(tert-butylperoxy)-2,5-dimethylhexane; tert-butylperoxy 2-ethylhexyl carbonate; 2,4-Pentanedione peroxide; and combinations thereof.

Preferably, the hydroperoxide is tert-butyl hydroperoxide;

According to a preferred embodiment of the present invention, the acid and the modifying agent are present in a molar ratio ranging from 1:1 to 10:1. Preferably, the acid and the modifying agent are present in a molar ratio ranging from 1:1 to 5:1. More preferably, the acid and the modifying agent are present in a molar ratio ranging from 1:1 to 3:1.

According to a preferred embodiment of the present invention, the acid is sulfuric acid.

According to an aspect of the present invention, there is provided a method of delignification of plant material, said method comprising:
  providing said plant material comprising cellulose fibres and lignin;
  exposing said plant material requiring to a composition comprising:
    an acid;
    a modifying agent selected from the group consisting of: sulfamic acid; imidazole; imidazole derivatives; taurine; a taurine derivative; a taurine-related compound; alkylsulfonic acid; arylsulfonic acid; triethanolamine; and combinations thereof;
    a peroxide salt; and
    a peroxide;
for a period of time sufficient to remove substantially all (at least 80%) of the lignin present on said plant material. Preferably, the amount of lignin removed is more than 90%.

According to another aspect of the present invention, there is provided a process to separate lignin from a lignocellulosic feedstock, said process comprising the steps of:
  providing a vessel;
  providing said lignocellulosic feedstock;
  providing a composition comprising;
    an acid;
    a modifying agent selected from the group consisting of: sulfamic acid; imidazole; imidazole derivatives; taurine; a taurine derivative; a taurine-related compound; alkylsulfonic acid; arylsulfonic acid; triethanolamine; and combinations thereof;
    a peroxide salt; and
    a peroxide;
  exposing said lignocellulosic feedstock to said composition in said vessel for a period of time sufficient to depolymerize substantially all of the lignin present in said lignocellulosic feedstock into lignin oligomers and lignin monomers;
wherein said process is carried out at atmospheric pressure.

According to an aspect of the present invention, there is provided a one-pot process to separate lignin from a lignocellulosic feedstock, said process comprising the steps of:
  providing a vessel;
  providing said lignocellulosic feedstock;
  providing a composition comprising;
    an acid;
    a modifying agent selected from the group consisting of: sulfamic acid; imidazole; imidazole derivatives; taurine; a taurine derivative; a taurine-related compound; alkylsulfonic acid; arylsulfonic acid; triethanolamine; and combinations thereof;
    a peroxide salt; and
    a peroxide;
  exposing said lignocellulosic feedstock to said composition in said vessel for a period of time sufficient to depolymerize substantially all of the lignin present in said lignocellulosic feedstock into lignin oligomers and lignin monomers;
wherein said process is carried out at atmospheric pressure. Preferably, the composition further comprises a modifying agent selected from the group consisting of: imidazole; taurine; alkylsulfonic acid; arylsulfonic acid; triethanolamine; and combinations thereof. Preferably, the alkylsulfonic acid is selected from the group consisting of: methanesulfonic acid; ethanesulfonic acid; sulfamic acid and combinations thereof. Preferably, also, the arylsulfonic acid is selected from the group consisting of: toluenesulfonic acid; benzenesulfonic acid; and combinations thereof.

According to a preferred embodiment of the process of the present invention, the composition comprises:
  an acid;
  the modifying agent comprising a compound containing an amine group and a compound comprising a sulfonic acid moiety;
  a peroxide salt; and
  a peroxide.

According to a preferred embodiment of the present invention, the initial temperature of the composition prior to the step of exposing it to the lignocellulosic feedstock is below 50° C. Preferably, the initial temperature of the composition prior to the step of exposing it to the lignocellulosic feedstock is below 40° C. More preferably, the initial temperature of the composition prior to the step of exposing it to the lignocellulosic feedstock is below 30° C. Even more preferably, the initial temperature of the composition prior to the step of exposing it to the lignocellulosic feedstock is below 25° C.

According to a preferred embodiment of the present invention, the process generates microcrystalline cellulose.

According to another preferred embodiment of the present invention, the process generates nanocrystalline cellulose.

According to another preferred embodiment of the present invention, an amount of peroxide salt is added after a first run to the remaining composition left in the vessel (said one-pot) adding perborate to replenish $H_2O_2$ concentration after each run and re-using the composition. Preferably, an amount of peroxide is added after each subsequent run to the composition remaining in the vessel (said one-pot) so as to minimize the use of chemicals for repeated delignification reactions. Preferably, an amount of peroxide salt is added after a first run of separating lignin from a lignocellulosic feedstock to the remaining composition left in said vessel prior to a second run using the same composition.

According to a preferred embodiment of the present invention, the composition comprises an inorganic peroxide; an organic peroxide; or a combination thereof. Preferably, the inorganic peroxide is selected from the group consisting of: potassium persulfate, sodium perborate (base), sodium percarbonate (base), ammonium persulfate (base); and combinations thereof. More preferably, the inorganic peroxide salt is sodium perborate.

Preferably, the organic peroxide, of the general formula ROOR' (where R is a substituent with a carbon atom bonding to the oxygen and R' is not hydrogen) is selected from the group consisting of: dicumyl peroxide; tert-butyl peroxybenzoate; tert-butyl peroxide; tert-butyl peracetate; benzoyl peroxide; lauroyl peroxide; 2,5-Bis(tert-butylper-oxy)-2,5-dimethylhexane; tert-Butylperoxy 2-ethylhexyl carbonate; 2,4-Pentanedione peroxide; and combinations thereof. More preferably, the organic peroxide is benzoyl peroxide.

According to another preferred embodiment of the present invention, the organic peroxide comprises hydroperoxide compounds of the general formula ROOR" (where R is a substituent with a carbon atom bonding to the oxygen and R" is hydrogen). Preferably, the organic hydroperoxide is tert-Butyl hydroperoxide.

According to a preferred embodiment of the present invention, there is provided a method to use peroxide salts to significantly increase reaction rate when using modified Caro's acid type mixtures for the delignification of biomass. Preferably, this method allows to reduce the time needed for delignification and the consumption of peroxide in the reaction mixture by unnecessary side reactions.

Delignification at low temperatures and at atmospheric pressure typically requires very potent compositions in order to effectively and substantially remove lignin from lignocellulosic feedstock. Ultimately, there are a wide array of industrial and consumer products which can use varying qualities of cellulose (i.e. cellulose with different amounts of bound lignin). Cardboard products, for example, contain residual amount of lignin which can reach upwards of 20%. Hence, complete delignification is not always necessary when processing lignocellulosic feedstock. Higher end cellulosic products, such as those used in the pharmaceutical industry, require more complete delignification of lignocellulosic feedstock but the volume amounts of those types of products are generally lower than for cardboards and other bulk transport applications (such as heavy paper and the like).

Nevertheless, lignin as well as lignin monomers have become a valuable by-product of the processing of lignocellulosic feedstock and rather than being burned simply as a source of heat, most often used in the processing of said feedstock, it can be incorporated into the chemical industry as a source of starting material in chemical synthesis for example, creating a very viable and valuable alternative for the chemical industry now dependent on hydrocarbon sources. It is for this reason that it is highly desirable to maintain as complete as possible, the integrity of lignin and lignin monomers (paracoumaryl alcohol, coniferyl alcohol and sinapyl alcohol) upon their separation from cellulose and hemicellulose.

DESCRIPTION OF THE INVENTION

The experiments carried out using an aqueous acidic composition according to a preferred embodiment of the present invention has shown that wood chips can undergo delignification under controlled reaction conditions and eliminate or at least minimize the degradation of the lignocellulosic biomass and cellulose as well as provide lignin degradation products which are soluble (i.e. separated from cellulose). Degradation of cellulose is understood to mean a darkening of cellulose, which is symbolic of an uncontrolled acid attack on the cellulose and staining/oxidization thereof.

Preferably, sulfuric acid and the source of peroxide, which, in the case of the experiments conducted was hydrogen peroxide, were present at varying ratios throughout the experiments. With respect to the modifiers (or modifying agent) it is believed that compounds having a sulfonic acid group along with an amine group can be effective modifying agents for strong acids such as sulfuric acid. The strength of the modified acid is dictated by the moles of sulfuric acid to the moles of the modifying agent. Hence, a composition comprising a molar ratio of 6:1 of sulfuric acid:modifier would be much less reactive than a composition of the same components in a 28:1 molar ratio.

During the delignification process, peroxide is consumed. Therefore, the liquid contains less peroxide the more lignin is processed. When the delignification solution is to be reused in order to reduce waste water, the peroxide concentration needs to be increased again to have the same reactivity of the blend as in the previous batch. Therefore, it is preferable to add a peroxide salt that can increase the concentration of a re-used delignification composition without diluting it with the addition of hydrogen peroxide solution.

According to a preferred embodiment of the present invention, there is a composition comprising an acid; a modifying agent; a source of peroxide (includes all forms of peroxide, i.e. hydrogen peroxide, peroxide salts, peroxoacids etc.) and a peroxide salt which when used during a process to delignify biomass can achieve results of complete removal of lignin with loss of only 20% of the cellulose fibre mass under conditions of atmospheric pressure and room temperature conditions. Preferably, the process can yield cellulose with only a 15% loss in the fibre mass. More preferably, the process can yield cellulose with only a 10% loss in the fibre mass. Even more preferably, the process can yield cellulose with only a 5% loss in the fibre mass.

According to another preferred embodiment, the modified acid is created by combining a mineral acid such as sulfuric acid with a compound comprising an amine moiety and a sulfonic acid moiety selected from the group consisting of: taurine and derivatives thereof such as taurine-related compounds; wherein the sulfuric acid and said amine-containing compound are present in a mole ratio ranging from 3:1 to 100:1. More preferably, the sulfuric acid and said amine-containing compound are present in a mole ratio ranging from 5:1 to 50:1. Even more preferably, the sulfuric acid and said aminosulfonyl-containing compound are present in a mole ratio ranging from 5:1 to 10:1.

Preferably, the modifying agent selected from the group consisting of: sulfamic acid; imidazole; imidazole derivatives; taurine; a taurine derivative; a taurine-related compound; alkylsulfonic acid; arylsulfonic acid; triethanolamine; and combinations thereof. Preferably, the alkylsulfonic acid is selected from the group consisting of: methanesulfonic acid; ethanesulfonic acid; propanesulfonic acid; butanesulfonic acid and combinations thereof. Preferably, the arylsulfonic acid is selected from the group consisting of: toluenesulfonic acid; benzenesulfonic acid; and combinations thereof. Preferably, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

Preferably, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

According to another preferred embodiment of the present invention, there is provided a composition comprising:
an acid;
the modifying agent comprises a compound containing an amine group and a compound comprising a sulfonic acid moiety;
a peroxide salt; and
a peroxide.

According to another preferred embodiment of the present invention, the modifying agent comprises a compound containing an amine group and a compound comprising a sulfonic acid moiety. Preferably, the compound containing an amine group has a molecular weight below 300 g/mol. Also preferably, said compound containing an amine group has a molecular weight below 150 g/mol. More preferably, said compound containing an amine group is a tertiary amine. Even more preferably, said compound containing an amine group is triethanolamine.

Preferably, said compound comprising a sulfonic acid moiety is selected from the group consisting of: alkylsulfonic acid; and arylsulfonic acid. More preferably, the arylsulfonic acid is selected from the group consisting of: orthanilic acid; metanilic acid; sulfanilic acid; benzenesulfonic acid; and toluenesulfonic acid.

EXAMPLES

The composition according to a preferred embodiment of the present invention used in the delignification test was prepared by dissolving 1 molar equivalent of taurine into 6 moles of sulfuric acid and subsequently adding hydrogen peroxide. Once this step was completed, a peroxide salt was added to the composition to obtain a modified Caro's acid composition with a peroxide salt.

In one of the preferred compositions, the final composition comprised sulfuric acid:hydrogen peroxide:taurine with peroxide salt in a 6:6:1 molar ratio with 20 g of salt. The resulting pH of the composition is less than 1. Preferably, the resulting pH of the composition was less than 0.5. A range of compositions with the same acid, peroxide and modifying agent components were prepared and various peroxide salts were tested to assess the effectiveness of each composition in the delignification reaction.

The compositions were clear and odorless with densities between 1.1 and 1.8 g/cm3. One of the advantages of the composition used in the process according to the present invention was the decreased reactivity of the composition as it is being prepared and upon exposure to the lignocellulosic feedstock.

The currently employed processes for pulp production—the kraft and the sulfite process—generate a large amount of contaminated waste water. A method and composition was developed to reduce the amount of water used in the delignification of plant-based biomass.

In developing a dry package for biomass digestion, a persulfate salt was added to water in excess (above the solubility limit). The wood material did bleach somewhat but even after several days still had the consistency and color of the wood shavings initially added. 73% of the initially added mass was recovered, indicating that a large portion of lignin and presumably hemicellulose was still intact. A FT-IR spectrum showed close resemblance to a wood FT-IR spectrum. This shows that a peroxide salt alone is not sufficiently strong to delignify lignocellulosic biomass. An acid needs to be added to de-polymerize lignin. Some advantages of a dry package would be the easier and much safer transport of a composition to remote sites where lignocellulosic biomass can be processed de-centralized. At site only water needs to be added to the dry package. Transporting less water is advantageous for the environment and transport safety.

Therefore, adding a solid acid, e.g. sulfonic acids to a peroxide salt or solid organic peroxide source would afford such a dry package.

Experiment #1

A set of control experiments were run where the persulfate salt is added just below the solubility limit (to have a clear solution) and lignin, cellulose and wood are added respectively. While the wood is not digested completely and 96% of the cellulose is recovered as expected, an FT-IR spectrum of the recovered lignin shows quite a different response than the spectrum of the initially added lignin, indicating a chemical reaction takes place that modifies the added material even in solid state.

The added persulfate salt alone is not powerful enough to achieve complete delignification of the biomass in a reasonable timeframe. However, in a preferred embodiment of the present invention, when the persulfate salt is added to an acid/peroxide solution (up to the solubility limit or less) with a molar ratio for the sulfuric acid (96%) and hydrogen peroxide (30%) between 3:1 and 1:3—ideally 1:1. The reaction rate is very high, while still being controlled, and the plant biomass is bleached completely sulfonic acid was added as a retardant (between 0.1 and 1 parts, depending on the solubility) within 19 h under ambient conditions.

The resulting cellulose is film- or paper-like and FT-IR spectra show very close resemblance to that for reference cellulose. In general, when a mixture with a fast reaction rate, i.e. little to no water added, is used, the resulting cellulose tends to be more film-like. When slow reaction rates are applied, i.e. mixtures with higher water concentrations, the resulting cellulose crystals are more needle-like. This enables one to control what form of cellulose is produced.

These findings can also be reproduced when, instead of persulfate, perborate or percarbonate were used in the reaction mixture as additives. One hypothesis to explain the reason for the accelerated reaction rate is that the peroxide-salts shifts the equilibrium of the persulfuric acid formation towards a higher concentration of the persulfuric acid. Perborate reacted fairly quickly. In less than 30 hours wood could be completely delignified. Percarbonate was slower to react, probably due to the percarbonate pH buffer effect that shifts pH towards neutral and a reduction of titratable acid by about 50%. The same is true for ammonium persulfate.

Experiment #2

In a scale-up of the wood delignification with an acid/peroxide/sulfonic acid mixture with added persulfate salt (half the solubility limit), complete delignification could be achieved in 19 hours. This was similar to what had been observed in the smaller scale experiment (experiment #1).

The filtrate was titrated for acid and peroxide content, and then the filtrate was reused for two more charges of wood without adding any components before each run. The acid content stays the same after the three delignification procedures. However, the peroxide content drops significantly. This means that a starting combination can be reused, and the peroxide salt can be added to refresh the solution after each cycle. The decomposition products can optionally be extracted with an immiscible organic solvent, e.g. toluene or diethyl acetate, then the filtrate can be reused. This would significantly reduce the amount of water/acid used in the process. This would also reduce the amount of toxic waste that is produced with the kraft and sulfite processes. Also, with the addition of peroxide salts the peroxide concentration in the solution can be increased leading to a faster reaction rate. Using ambient conditions is a big advantage over the kraft and sulfite processes. With the increased reaction rates and reduced water consumption, this novel process has clear advantages over the established processes.

When performing delignification of lignocellulosic biomass using a composition according to a preferred embodiment of the present invention, the process can be carried out at substantially lower temperatures than temperatures used in the conventional kraft pulping process. The advantages are substantial, here are a few: the kraft pulping process requires temperatures in the vicinity of 176-180° C. in order to perform the delignification process, a preferred embodiment of the process according to the present invention can delignify wood at far lower temperatures, even as low as 15° C. According to a preferred embodiment of the present invention, the delignification of wood can be performed at temperatures as low as 30° C. According to another preferred embodiment of the present invention, the delignification of wood can be performed at temperatures as low as 40° C. According to yet another preferred embodiment of the present invention, the delignification of wood can be performed at temperatures as low as 50° C. According to yet another preferred embodiment of the present invention, the delignification of wood can be performed at temperatures as low as 60° C. Other advantages include: a lower input of energy; reduction of emissions and reduced capital expenditures; reduced maintenance; lower shut down/turn-around costs/scalability/lower technical support requirements/fewer permitting challenges or requirements vs large kraft process facilities/small footprint—land requirements/less pollution (chlorine or sulfite containing compounds are not used in the process according to the present invention)/recycling of chemicals; also, there are HSE advantages compared to conventional kraft pulping compositions.

In each one of the above preferred embodiments, the temperature at which the processes are carried out are substantially lower than the current energy-intensive kraft process which correlates to increased commercial viability, lower pollution, less investment and infrastructure requirements etc.

Moreover, the kraft process uses high pressures to perform the delignification of wood which is initially capital intensive, dangerous, expensive to maintain and has high associated turn-around costs. According to a preferred embodiment of the present invention, the delignification of wood can be performed at atmospheric pressure. This, in turn, circumvents the need for highly specialized and expensive industrial equipment such as pressure vessels/digestors. It also allows the implementation of delignification units in many of parts of the world where the implementation of a kraft plant would previously be impracticable due to a variety of reasons.

Some of the advantages of a process according to a preferred embodiment of the present invention, over a conventional kraft process are substantial as the heat/energy requirement for the latter is not only a great source of pollution but is in large part the reason the resulting pulp product is so expensive and has high initial capital requirements. The energy savings in the implementation of a process according to a preferred embodiment of the present invention would be reflected in a lower priced pulp and environmental benefits which would have both an immediate impact and a long-lasting multi-generational benefit for all.

Further cost savings in the full or partial implementation of a process according to a preferred embodiment of the present invention, can be found in the absence or minimization of restrictive regulations for the operation of a high temperature and high-pressure pulp digestors.

According to an aspect of the present invention, various degrees of cellulose crystallinity depending on the intended use of the cellulose can be achieved. For example, it may be advantageous to produce mostly amorphous cellulose fibres (intended for ethanol production, for example) or highly crystalline cellulose (intended for pharmaceutical industry application, as example).

A substantial advantage of the use of the process according to a preferred embodiment of the present invention is that compared to currently used methods of making MCC and NCC, the current process can directly result into the generation of MCC and NCC. Other commercially employed processes obtain a pulp (such as kraft pulp) and then subsequently treat this pulp to generate MCC and/or NCC.

Experiment #3

Reusing modified acid compositions for delignification of lignocellulosic biomass would be advantageous, as the resulting reduction in chemicals used and minimization of waste would result in reduced processing cost. The component consumed during the delignification reaction is hydrogen peroxide. The acid and the modifier are not consumed.

Wood pellets were utilized as the feedstock in this experiment that were processed through a mill to yield product that were predominantly smaller than 2 mm. Also incorporated as a feedstock were walnut shells (typically used for sandblasting (12-20 grit) or burned), pure pine shavings, as well as hemp straw, alfalfa straw, wheat straw, peanut shells and mill feed. All of these items are common, widely available feedstocks and are typically not converted to a commercially viable product in scale.

The compositions used in this series of experiments are clear, odorless solutions of pH<0; densities are between 1.1 and 1.8 g/cm$^3$; the blends decompose when heating, so boiling points cannot be determined.

The modified acid composition according to a preferred embodiment of the present invention comprised a base blend having the following molar ratio of a sulfuric acid:peroxide:modifying agent+peroxide salt in a 6:6:1 molar ratio. Varying amounts of peroxide salt (depending on the salt) were added to the base blend to create the reaction compositions. For the static runs: 325 g of base blend was prepared followed by 20 g of persulfate, or 10.2 g of sodium perborate, depending on the blend. The reactions with biomass (1 g per run) were carried out for a duration of 90 minutes at room temperature and at atmospheric pressure. After this reaction time, the mixture was filtered and the hydrogen peroxide concentration determined by titration. Then, fresh biomass is added to the filtrate for a second run. This was repeated one more time for a total of 3 runs with one blend. The parameters of Experiment #3 are listed in Table 1 below.

TABLE 1

Parameters prior to runs 1, 2, and 3 for experiment #3 (under static conditions) using perborate and persulfate as peroxide salts

| ratio 6:6:1 | salt added [g] | $H_2O_2$ conc [mass %] |
|---|---|---|
| perborate - static | | |
| Run #1 | 10.20 | 10.15 |
| Run #2 | 0.00 | 9.04 |
| Run #3 | 0.00 | 7.98 |
| persulfate - static | | |
| Run #1 | 20.00 | 10.58 |
| Run #2 | 0.00 | 9.42 |
| Run #3 | 0.00 | 8.50 |

The static approach—adding a fixed amount of peroxide salt to the blend (modified acid composition comprising the peroxide) before the first biomass addition, without any additional peroxide salt added prior to runs 2 and 3—shows a decline in peroxide concentration with each run.

Experiment #4

A second series of experiments was carried out where the acid compositions (base blend) comprises sulfuric acid: peroxide:modifying agent+peroxide salt where the molar ratios are 6:6:1. Varying amounts of peroxide salt (depending on the salt) are added to the base blend to create the reaction composition. For the dynamic runs: 325 g of base blend was prepared followed by the addition of 20 g of persulfate, or 10.2 g of sodium perborate, depending on the blend. The reactions with biomass (1 g per run) were carried out for a duration of 90 minutes at room temperature and at atmospheric pressure. After this reaction time, the mixture was filtered and the hydrogen peroxide concentration determined by titration. After run 1 and run 2, 3.13 g of sodium perborate or 6.15 g of persulfate was added to the reaction vessel. The parameters of the dynamic experiments are reported in Table 2 below.

TABLE 2

Parameters prior to runs 1, 2, and 3 for experiment #4 (under dynamic conditions) using perborate and persulfate as peroxide salts

| perborate - dynamic | | |
|---|---|---|
| ratio 6:6:1 | salt added [g] | $H_2O_2$ conc [mass %] |
| Run #1 | 10.20 | 9.85 |
| Run #2 | 3.13 | 9.68 |
| Run #3 | 3.13 | 9.44 |
| persulfate - dynamic | | |
| Ratio 6:6:1 | salt added [g] | $H_2O_2$ conc [mass %] |
| Run #1 | 20.00 | 11.15 |
| Run #2 | 6.15 | 10.00 |
| Run #3 | 6.15 | 9.18 |

Under similar conditions as those of Experiment #3 (static), a dynamic approach to delignification was taken by allowing for replenishment of the peroxide salt between the $1^{st}$ and $2^{nd}$ runs and between the $2^{nd}$ and $3^{rd}$ runs.

It can be seen that, when adding perborate salt, the peroxide concentration stays substantially constant over the course of 3 runs. This clearly shows that a blend can be "refreshed" or replenished by adding a peroxide salt according to a preferred embodiment of the process of the present invention and therefore reused without adding hydrogen peroxide solution which would dilute the blend (modified acid composition comprising the peroxide) and consequently make it less reactive.

The data obtained from a second series of experiments and reported in Table 2 above, clearly establishes that a composition comprising sulfuric acid with a modifying agent (taurine), a source of peroxide ($H_2O_2$) and perborate salt under dynamic or static conditions can be useful in the delignification of lignocellulosic biomass when such operation is carried out at room temperature under atmospheric pressure.

On the basis of the results from the testing which was carried out, it is expected that such compositions could be used on a wide variety of lignocellulosic plants and waste material in the removal of lignin and separation thereof from cellulosic material in such a way as to utilize equipment and processes which do not require high pressures and/or high temperatures. This allows for considerable amount of flexibility for the implementation of large-scale operations employing such processes as well as substantially smaller investments as the engineering complexities are greatly reduced because of the parameters under which the processes can be carried out. In addition to the greatly minimized capital expenditures, reduced technical complexities, pollution by-products reduction (or elimination), scalability utilizing existing infrastructure is viable resulting in further reductions of capital requirements.

The above experiments present a clear indication that preferred compositions according to the present invention not only provides an adequate technology to delignify plant material and/or woody biomass waste, but is also valuable in controlling the ultimate degradation of cellulosic material into carbon black residue common in the kraft process resulting in higher yields and qualities for industry, thus increasing profitability while reducing emissions and the risk to the employees, contractors and public.

A method to yield glucose from wood pulp as well as the other products (monosaccharides from the hemicellulose and lignin oligomers and monomers) would represent a significant advancement to the currently used processes where the conversion of such is chemical and energy intensive, costly, emissions intensive and dangerous, all while not resulting in highly efficient results, especially in large-scale operations. Monosaccharides resulting from hemicellulose include various monosaccharides (sugars) such as, but not limited to: D-xylose; D-glucose; D-mannose; D-galactose; and L-arabinose; and sugar acids such as, but not limited to: D-glucuronic and D-galacturonic acids, depending on the plant species.

It is desirable to employ a composition which can delignify lignocellulosic biomass but also allows industry (operators) a level of control in order to preserve the commercially valuable cellulose rather than degrading it to a non-commercial carbon black product resulting in higher efficiencies, increased profitability and yields along with increased safety and reduced overall costs. Preferably, said composition used under appropriate conditions can also generate highly crystalline cellulose. The crystallinity of cellulose can be assessed by methods such as X-ray diffraction. Preferably, a composition according to the present invention can generate cellulose which has a crystallinity level above 60%.

A method to yield glucose from wood pulp as well as the other products (monosaccharides from the hemicellulose and lignin oligomers and monomers) would represent a significant advancement to the current process where the conversion of such is chemical and energy intensive, costly, emissions intensive and dangerous, all while not resulting in highly efficient results, especially in large-scale operations. Monosaccharides resulting from hemicellulose include various monosaccharides (sugars) such as, but not limited to: D-xylose; D-glucose; D-mannose; D-galactose; and L-arabinose; and sugar acids such as, but not limited to: D-glucuronic and D-galacturonic acids, depending on the plant species.

It is desirable to employ a composition which can delignify lignocellulosic biomass but also allows industry a level of control in order to preserve the commercially valuable cellulose rather than degrading it to a non-commercial carbon black product resulting in higher efficiencies, increased profitability and yields along with increased safety and reduced overall costs. Preferably, said composition used under appropriate conditions can also generate highly crystalline cellulose. The crystallinity of cellulose can be assessed by methods such as X-ray diffraction. Preferably, a composition according to the present invention can generate cellulose which has a crystallinity level above 60%.

Analysis of the Cellulose Extracted

The cellulose recovered from the series of experiments was analyzed under X-ray diffraction in order to assess the crystallinity of the product. The results of the analysis are reported below in Table 3.

TABLE 3

Results of the XRD of various samples of cellulose recovered from the process according to a preferred embodiment of the present invention

| Sample # | Crystallinity in % |
|---|---|
| Sample 1 | 64.6 |
| Sample 2 | 62.9 |
| Sample 3 | 66.3 |
| Sample 4 | 64.2 |
| Sample 5 | 63.2 |

Sample #2 is a commercially available microcrystalline cellulose.

According to a preferred embodiment of the method of the present invention, the separation of lignin can be realized and the resulting cellulose fibres can be further processed to yield glucose monomers. Glucose chemistry has a multitude of uses including as a starting block in the preparation of widely used chemicals, including but not limited to, diacetonide, dithioacetal, glucoside, glucal and hydroxyglucal to name but a few.

The embodiments described herein are to be understood to be exemplary and numerous modification and variations of the present invention are possible in light of the above teachings. It is therefore to be understood that within the scope of the claims appended hereto, the invention may be practiced otherwise than as specifically disclosed herein.

What is claimed is:

1. A composition comprising:
an acid;
a modifying agent selected from the group consisting of: sulfamic acid; imidazole; imidazole derivatives; taurine; taurine derivatives; taurine-related compounds; alkylsulfonic acids; arylsulfonic acids; triethanolamine; and combinations thereof;
a peroxide salt; and
a peroxide,
wherein the acid and the modifying agent are present in a molar ratio ranging from 1:1 to 10:1.

2. The composition according to claim 1, wherein the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

3. The composition according to claim 1, wherein the alkylsulfonic acid is selected from the group consisting of: methanesulfonic acid; ethanesulfonic acid; propanesulfonic acid; butanesulfonic acid and combinations thereof.

4. The composition according to claim 1, wherein the arylsulfonic acid is selected from the group consisting of: metanilic acid; orthanilic acid; sulfanilic acid; toluenesulfonic acid; benzenesulfonic acid; and combinations thereof.

5. The composition according to claim 1, wherein the acid and the peroxide salt are present in a molar ratio ranging from 1:1 to 100:1.

6. The composition according to claim 1, wherein the peroxide salt is selected from the group consisting of: organic peroxides; hydroperoxides; inorganic peroxides; and combinations thereof.

7. The composition according to claim 1, wherein the peroxide salt is an inorganic peroxide selected from the group consisting of: potassium persulfate, sodium perborate, sodium percarbonate; ammonium persulfate; and combinations thereof.

8. The composition according to claim 1, wherein the peroxide salt is an organic peroxide is selected from the group consisting of: dicumyl peroxide; tert-butyl peroxybenzoate; tert-Butyl hydroperoxide; tert-butyl peroxide; tert-butyl peracetate; benzoyl peroxide; lauroyl peroxide; 2,5-Bis(tert-butylperoxy)-2,5-dimethylhexane; tert-Butylperoxy 2-ethylhexyl carbonate; 2,4-Pentanedione peroxide; and combinations thereof.

9. The composition according to claim 1, wherein the acid and the modifying agent are present in a molar ratio ranging from 1:1 to 5:1.

10. The composition according to claim 1, wherein the acid is sulfuric acid.

11. A composition comprising:
an acid;
a modifying agent comprising a compound containing an amine group and a compound comprising a sulfonic acid moiety;
a peroxide salt; and
a peroxide,
wherein the acid and the modifying agent are present in a molar ratio ranging from 1:1 to 10:1.

12. The composition according to claim 11, wherein the compound comprising a sulfonic acid moiety is selected from the group consisting of: alkylsulfonic acid; and arylsulfonic acid.

13. The composition according to claim 11, wherein the compound comprising a sulfonic acid moiety is an arylsulfonic acid is selected from the group consisting of: orthanilic acid; metanilic acid; sulfanilic acid; benzenesulfonic acid; and toluenesulfonic acid.

* * * * *